United States Patent [19]

Rubemeyer et al.

[11] Patent Number: 4,850,434

[45] Date of Patent: Jul. 25, 1989

[54] VIBRATING DEEP RIPPER

[75] Inventors: Ronald W. Rubemeyer, Waterloo; James L. Gibson, Sparta, both of Ill.

[73] Assignee: Peabody Coal Company, St. Louis, Mo.

[21] Appl. No.: 189,820

[22] Filed: May 3, 1988

[51] Int. Cl.⁴ .................. A01B 35/00; A01B 13/08
[52] U.S. Cl. ............................ 172/40; 172/125; 172/699
[58] Field of Search ............... 172/40, 699, 700, 773, 172/44, 125; 37/DIG. 18; 405/182

[56] References Cited

U.S. PATENT DOCUMENTS

| | | | |
|---|---|---|---|
| 3,349,854 | 10/1967 | Cain | 172/40 |
| 3,448,813 | 6/1969 | Rogers | 172/40 |
| 3,698,484 | 10/1972 | Kinnan | 37/DIG. 18 X |
| 4,159,745 | 7/1979 | Hood | 172/44 |
| 4,336,844 | 6/1982 | Helbig | 172/700 X |

FOREIGN PATENT DOCUMENTS

| | | | |
|---|---|---|---|
| 0375354 | 3/1973 | U.S.S.R. | 37/DIG. 18 |
| 0458640 | 1/1975 | U.S.S.R. | 172/40 |

Primary Examiner—Richard J. Johnson
Assistant Examiner—Jeffrey L. Thompson
Attorney, Agent, or Firm—Senniger, Powers, Leavitt & Roedel

[57] ABSTRACT

Tilling apparatus, particularly for deep ripping of the soil, adapted to be towed by a tractor having teeth for penetrating the ground, each tooth being hollow, having an unbalanced rotor housed therein adjacent its lower end, a motor mounted on the side of the tooth adjacent its upper end, and drive means housed in the tooth driven by the motor and operable to drive the rotor for causing vibration of the lower end portion of the tooth.

18 Claims, 5 Drawing Sheets

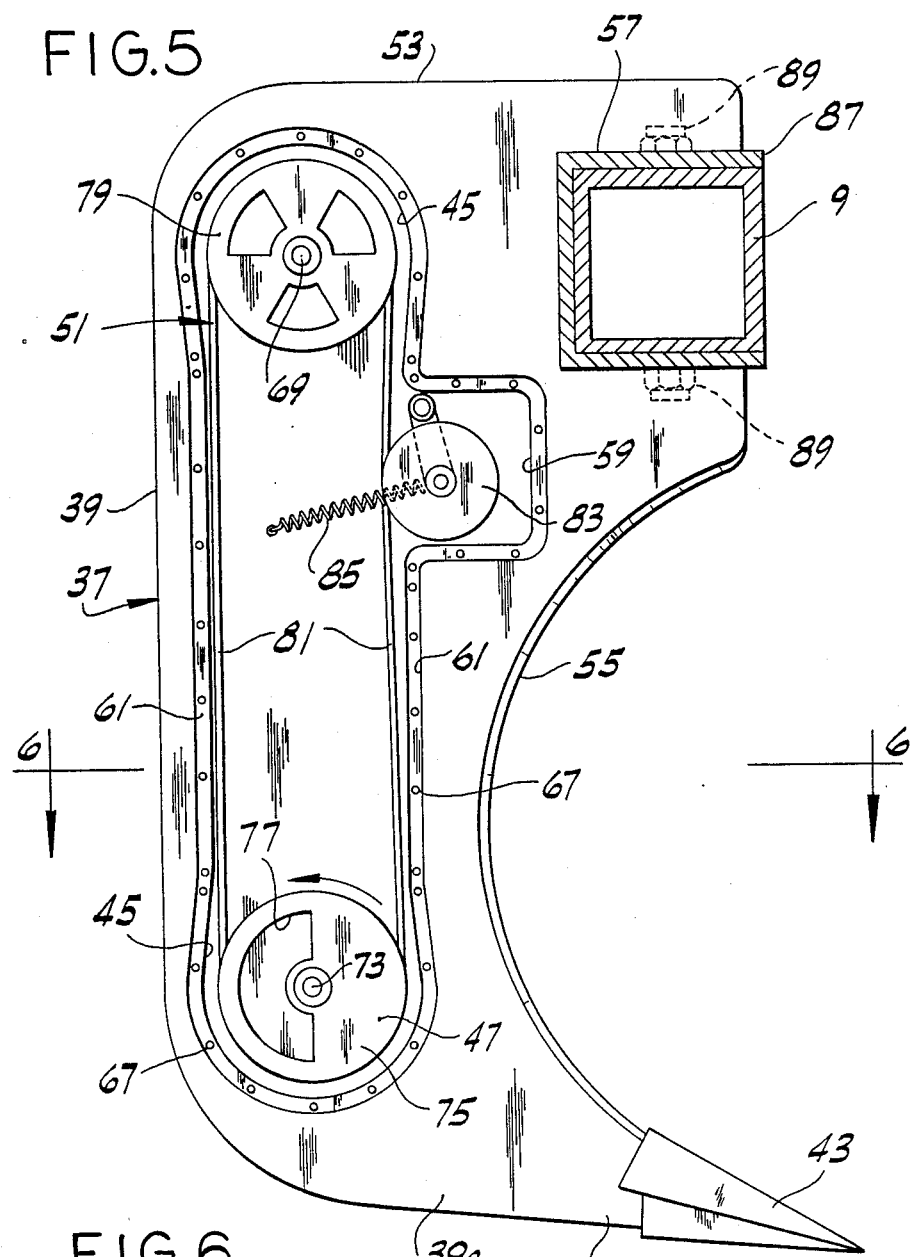
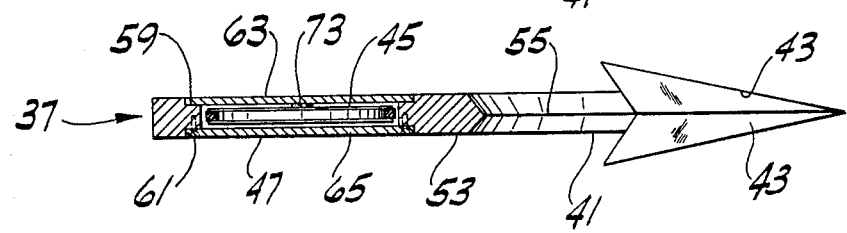

VIBRATING DEEP RIPPER

BRIEF SUMMARY OF THE INVENTION

This invention relates to tilling apparatus and more particularly to a so-called vibratory deep tiller or ripper for loosening soil to a substantial depth (e.g., 32 to 34 inches) for conditioning the soil for accumulation of moisture and for enabling more ready penetration of the soil by roots of crops and particularly roots of corn.

The apparatus of this invention has been developed particularly for deep tilling or ripping of soil which has been applied in the reclamation of land following strip mining, and especially land in Illinois and Kentucky following strip mining of coal, the soil having been relatively heavily compacted in the course of the reclamation project by vehicles traveling over it. Generally, the soil is so heavily compacted as to inhibit sufficient accumulation of moisture therein and penetration of the soil by the roots of crops for successfully growing crops and particularly corn, the roots of which may need to penetrate to a depth corresponding to the height of the plant.

Among the several objects of the invention may be noted the provision of apparatus for tilling of the soil to a substantial depth for conditioning it for accumulation of moisture and more ready penetration by the roots of crops, such as corn, for increased yields; the provision of such apparatus which may be pulled by a conventional tractor and which is operable economically in respect to the depth of ripping that is attained (e.g., $45–$50 per acre for depths of 32"–34"); and the provision of such apparatus which is convenient to use and readily adjustable for ripping at different depths as may be needed.

In general, tilling apparatus of this invention comprises a vehicle for being towed by a tractor over ground to be tilled carrying at least one tooth for penetrating the ground as it is towed by the tractor. The tooth is of elongate relatively thin flat conformation having a shank attached adjacent one end thereof constituting its upper end to the vehicle and a forwardly directed pointed tip at its other end constituting its lower end, being carried by the vehicle in such position, for tilling, that the plane of the tooth is generally vertical extending in the direction of travel of the vehicle with the lower portion of the shank and the tip of the tooth below ground level. The shank is hollow with space therein extending from adjacent its upper end to adjacent its lower end. A rotor is journalled in and enclosed in said space adjacent the lower end of the shank on an axis extending transversely of the tooth and the vehicle, the center of gravity of the rotor being offset from said axis. A motor is mounted on one side of the tooth adjacent the upper end of the shank, and means housed in said space driven by said motor is operable to drive the rotor, rotation of the rotor causing vibration of the lower end portion of the tooth in the plane of the tooth for deep ripping of the soil as the vehicle is towed over ground to be tilled with the lower portion of the shank of the tooth and the tip of the tooth below ground level.

Other objects and features will be in part apparent and in part pointed out hereinafter.

BRIEF DESCRIPTION OF THE DRAWINGS

FIG. 5 is an enlarged vertical transverse section taken generally on line 5—5 of FIG. 4; and FIG. 6 is a generally horizontal section on line 6—6 of FIG. 5.

Corresponding reference characters indicate corresponding parts throughout the several views of the drawings.

DETAILED DESCRIPTION

Figure 1:
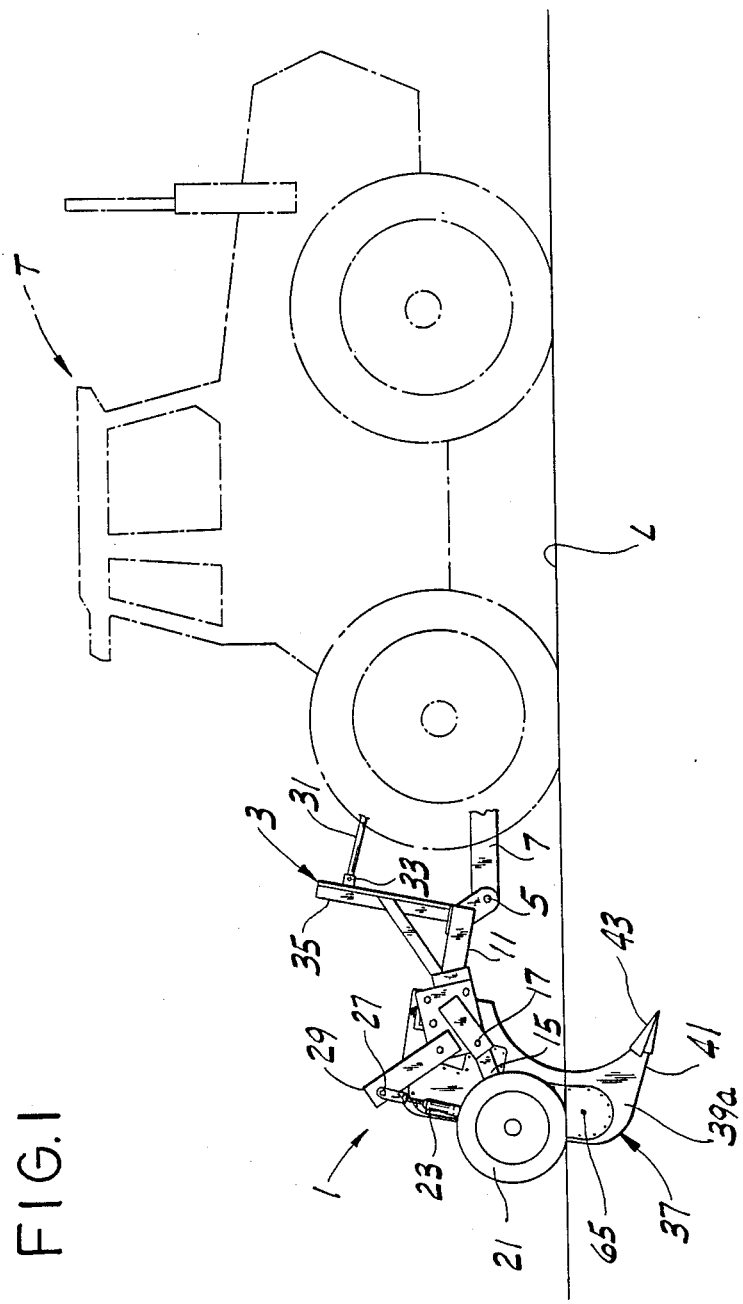
FIG. 1 is a view in side elevation of tilling apparatus of this invention showing in phantom a tractor for pulling it and showing a tooth of the apparatus down in the ground.

Referring to the drawings, tilling apparatus of this invention is shown generally to comprise a two-wheeled vehicle designated in its entirety by the reference numeral 1 for being towed by a tractor indicated at T over ground to be tilled, ground level being indicated at L. The vehicle 1 is illustrated as comprising a frame generally designated 3 pivoted as indicated at 5 on a hitch 7 extending back from the tractor T for up and down swinging movement relative to the hitch about a generally horizontal axis extending transversely with respect to the tractor and the hitch. The frame comprises a crossbar 9 shown as being of hollow square cross-section and members indicated at 11 extending forward therefrom to a pin connection at 5 with the hitch 7. At the ends of the crossbar are side plates 13. Arms 15 pivoted at 17 on straps 19 secured on the outside of the side plates carry the wheels 21 of the vehicle. Each wheel is adjustable up and down relative to the frame 3 around the axis of the pivot pins at 17 by means of a turnbuckle 23 pinned at one end as indicated at 25 to the arm 15 and at its other end as indicated at 27 to a member 29 extending up and back from the respective side plate 13. The entire frame 3 is swingable up and down on the axis of the pin connection at 5 by means of a hydraulic cylinder (not shown) as is conventionally provided on the tractor T having its piston rod 31 pin-connected at 33 to a member 35 extending up from the frame adjacent the forward ends of members 11.

Figure 2:
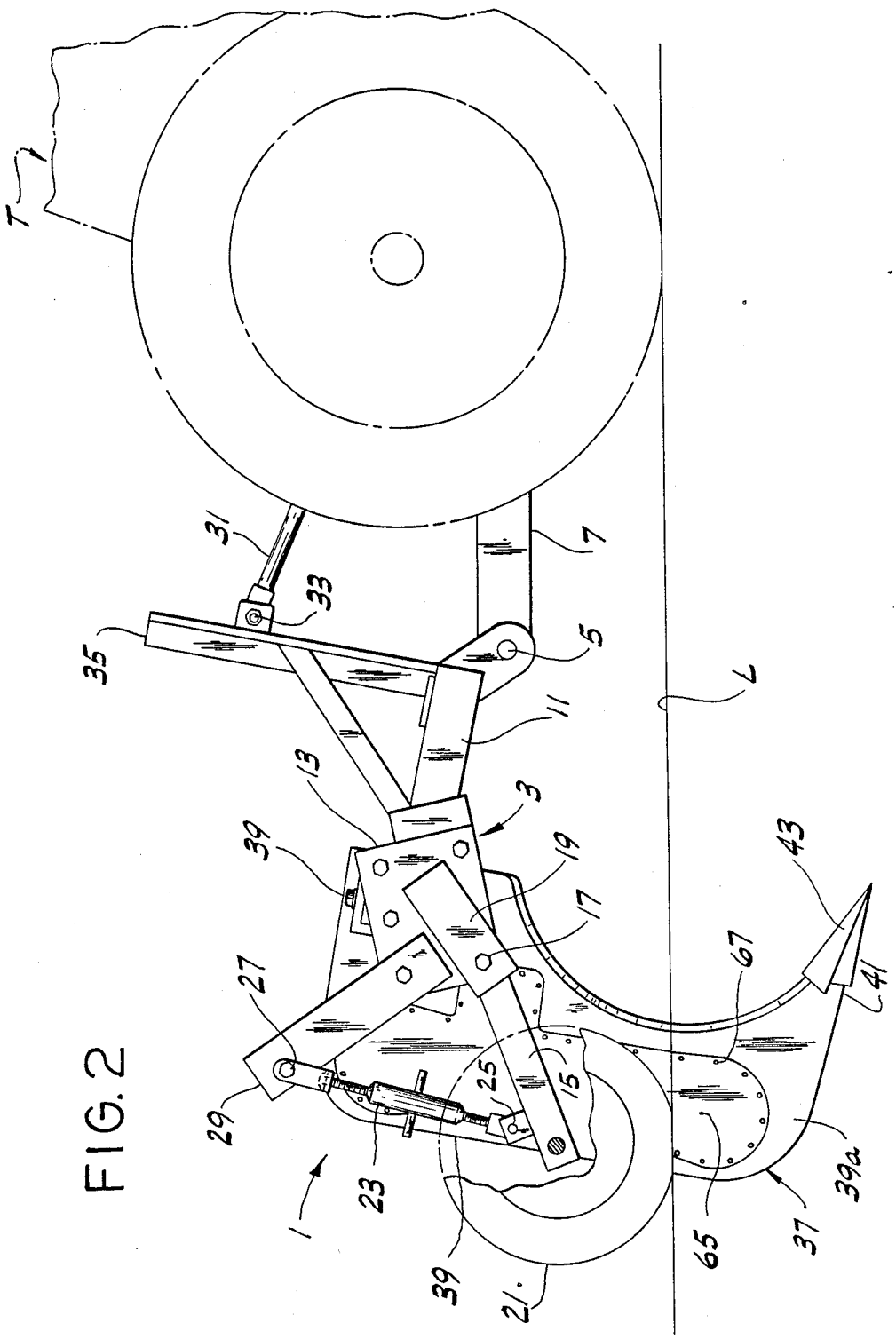
FIG. 2 is an enlarged fragment of FIG. 1.
Figure 3:
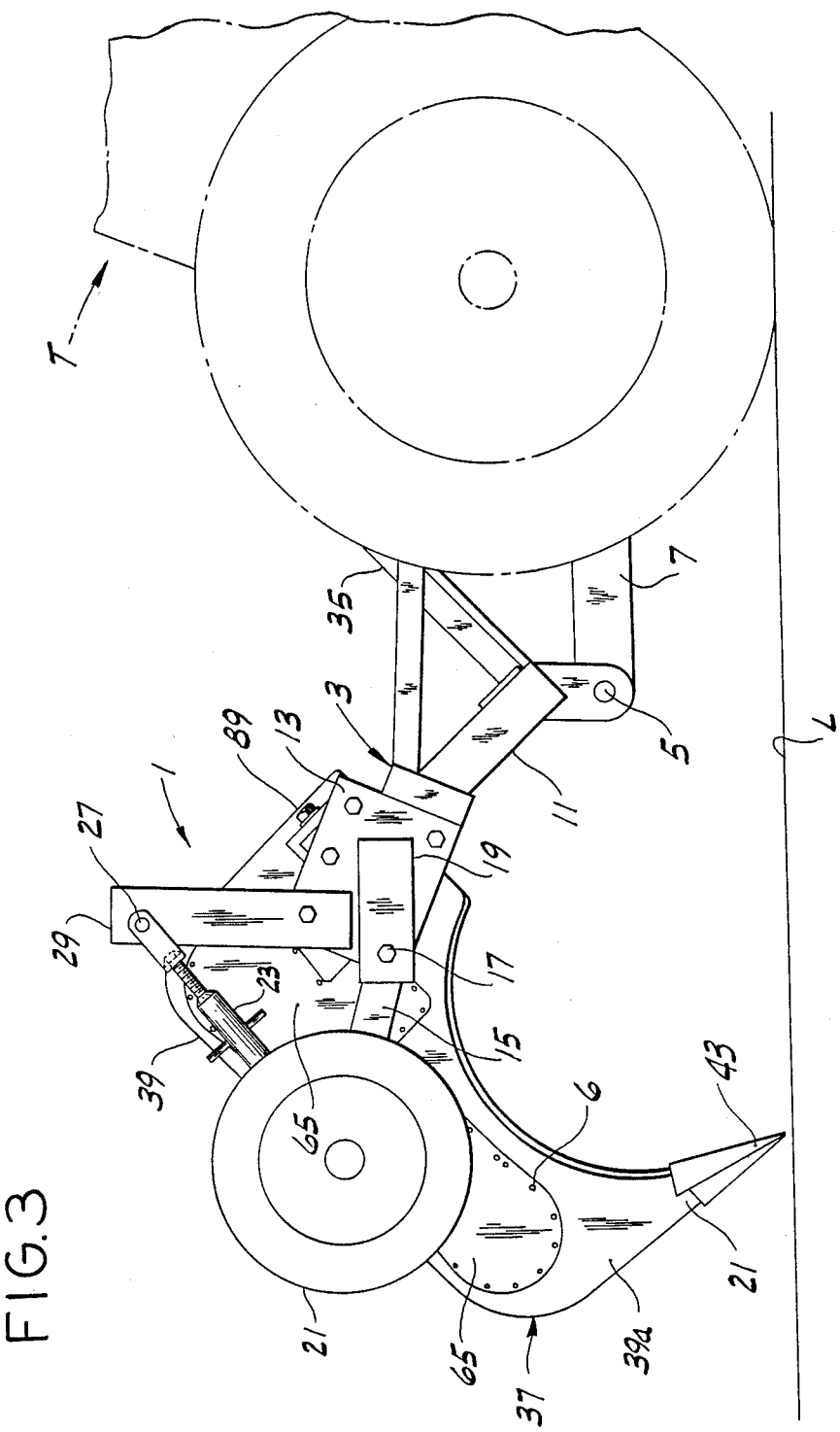
FIG. 3 is a view corresponding to FIG. 2 showing the tooth raised out of the ground.
Figure 4:
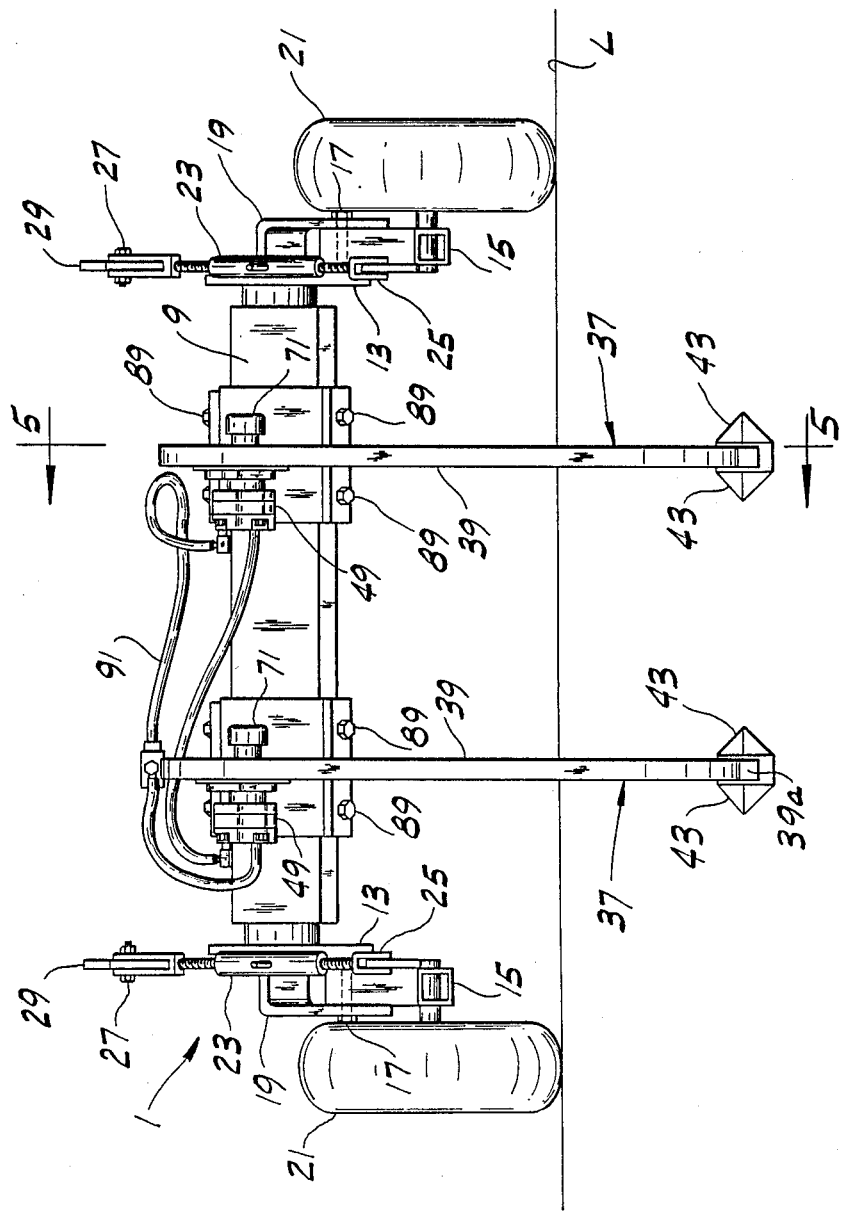
FIG. 4 is a rear end view of FIG. 2.

Two teeth, each generally designated 37, are mounted on the crossbar 9 in fixed side-by-side spaced relation between the wheels 21 for penetrating the ground to be tilled as the vehicle 1 is towed by the tractor thereover. Each tooth 37 is of relatively thin flat conformation having a shank 39 attached adjacent one end thereof constituting its upper end to the crossbar 9 of the vehicle and a forwardly directed pointed tip 41 at its other end and constituting its lower end. The tip of the tooth is provided at its forward end with laterally extending wings 43. Each tooth is carried by the crossbar 9 of the vehicle, fixed at its upper end to the crossbar, in such position, for tilling, that the plane of the tooth is generally vertical extending in the direction of travel of the vehicle 1 with the lower portion 39a of the shank and the tip 41 of the tooth below ground level L (see FIGS. 1 and 2). The shank 39 is made hollow with space 45 therein extending from adjacent its upper end to adjacent its lower end as appears in FIGS. 5 and 6. At 47 is indicated a rotor journalled in and enclosed in said space adjacent the lower end of the shank on an axis extending traversely of the tooth and the vehicle, the center of gravity of this rotor being offset from said axis. A motor 49, more particularly a hydraulic motor, is mounted on one side of the tooth adjacent the upper end of the shank of the tooth and means indicated generally at 51 housed in said space 45 driven by the motor is operable to drive the rotor 47, rotation of the rotor causing vibration of the lower end portion of the tooth in the plane of the tooth for deep ripping of the soil as the vehicle is towed over ground to be tilled with the lower portion of the shank of the tooth and the tip of the tooth below ground level.

Each tooth comprises a relatively thick steel plate 53 cut away at one edge thereof on a curve as indicated at 55 to form the tooth tip and at 57 to form a rectangular notch in said edge adjacent the upper end of the shank 39 of the tooth. An elongate opening forming the space 45 in the tooth is cut in the tooth extending from adjacent the upper end of the shank 39 to adjacent the lower end of the shank. This opening or space 45 is formed with an offset as indicated at 59. The thick steel plate 53 is rabbeted as indicated at 59 and 61 all around the opening 45 at the faces of the plate, 59 being on that side of the plate which is its left side viewed in the direction of forward travel of the apparatus and 61 being on the right side. A relatively thin steel plate 63 is secured in suitable manner, as by welding, in place in the rabbet at 59 closing the opening 45 on the left side, this plate being set in flush with the plate 53 on the left side. A relatively thin steel plate 65 is removably secured as by screws 67 in place in the rabbet at 61 closing the opening 45 on the right side, this plate 65 being set in flush with the plate 53 on the right side.

The motor 49 is mounted on the inset plate 63 on the outside thereof adjacent its upper end, the shaft 69 of the motor extending through a hole in plate 63 across the space 45 adjacent the upper end of the space into a bearing 71 mounted on the outside of the inset plate 65. The rotor 47 comprises a pulley journalled on a shaft 73 extending from plate 63 across the space 45 adjacent its lower end, this rotor or pulley 47 being shown as solid throughout one half thereof as indicated at 75 and having a cut-out as indicated at 77 in the other half thereof. The means 51 for driving the rotor 47 includes a pulley 79 secured on the shaft 69 in the space 45 adjacent its upper end in the same plane as the rotor 47 and a drive belt 81 housed in space 45 encircling the pulley 79 and the rotor, with a belt-tensioning roller such as indicated at 83 accommodated in offset 59 of space 45 biased into engagement with the belt by a coil tension spring 85.

Each tooth is mounted on the crossbar 9 for adjustment laterally of the vehicle to different lateral positions by having a C-shaped bracket 87 secured thereto as by welding in the aforesaid notch 57 in the tooth, this bracket fitting on the crossbar with a sliding fit and being adapted to be secured in adjusted position on the crossbar by set screws 89 at the top and bottom of the bracket. The hydraulic motors 49 are powered via flexible hydraulic lines such as indicated at 91 supplied with hydraulic fluid under pressure from a hydraulic pump (not shown) on the tractor T. Each motor may be, for example, a 1 to 1½ HP motor operable at relatively low hydraulic pressure to keep the temperature of the hydraulic fluid down for operation without any need for any special means for cooling the fluid. The arrangement is preferably such that the unbalanced rotor 47 is rotated in counterclockwise direction as viewed from the right side, (as shown by the directional arrow in FIG. 5), i.e., the center of gravity of the rotor travels forward as it passes through the lower part of its rotation about the axis of the rotor and rearward as it passes through the upper part of its rotation.

It has been found possible with apparatus as above described pulled by a 190 HP tractor and including the 1 to 1½ HP hydraulic motors 49 to rip soil in reclaimed areas to a depth of 32"–34", which promotes accumulation of moisture and root penetration for increased crop yield in a cost effective manner, e.g., at a cost of $45–$50 per acre.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Tilling apparatus comprising a vehicle for being towed by a tractor over ground to be tilled, said vehicle carrying at least one tooth for penetrating the ground as it is towed by the tractor, said tooth being of elongate relatively thin flat conformation having a shank attached adjacent one end thereof constituting its upper end to the vehicle and a forwardly directed pointed tip at its other end constituting its lower end, said tooth being carried by the vehicle in such position, for tilling, that the plane of the tooth is generally vertical extending in the direction of travel of the vehicle with the lower portion of the shank and the tip of the tooth below ground level, the tooth being fixedly mounted at its upper end on the vehicle, said shank being hollow with space therein extending from adjacent its upper end to adjacent its lower end, a rotor journalled in and enclosed in said space adjacent the lower end of the shank on an axis extending transversely of the tooth and the vehicle, the center of gravity of the rotor being offset from said axis, a motor mounted on one side of the tooth adjacent the upper end of the shank, and means housed in said space driven by said motor and operable to drive the rotor, rotation of the rotor causing vibration of the lower end portion of the tooth in the plane of the tooth for deep ripping of the soil as the vehicle is towed over ground to be tilled with the lower portion of the shank of the tooth and the tip of the tooth below ground level.

2. Tilling apparatus as set forth in claim 1 having two said teeth mounted in fixed side-by-side spaced relation on the vehicle.

3. Tilling apparatus as set forth in claim 2 wherein the teeth are mounted on the vehicle for adjustment laterally with respect to the vehicle to different lateral positions.

4. Tilling apparatus as set forth in claim 1 wherein the tooth is mounted for adjustment to different levels.

5. Tilling apparatus as set forth in claim 4 wherein the tooth is fixedly mounted at its upper end on means which is swingably mounted with respect to the vehicle for adjustment to said different levels.

6. Tilling apparatus as set forth in claim 5 having two said teeth mounted in fixed side-by-side spaced relation on said swingably mounted means.

7. Tilling apparatus as set forth in claim 6 wherein the teeth are mounted on said swingably mounted means for adjustment laterally with respect to the vehicle to different lateral positions.